United States Patent
Menuey et al.

(10) Patent No.: US 9,121,295 B2
(45) Date of Patent: Sep. 1, 2015

(54) METHOD FOR MANUFACTURING A THERMAL-BARRIER PROTECTION AND MULTILAYER COATING SUITABLE FOR FORMING A THERMAL BARRIER

(75) Inventors: Justine Menuey, Annecy (FR); Florence Ansart, Labege (FR); Jean-Pierre Bonino, Pechabou (FR); Justine Fenech, Bedarrides (FR); Celine Viazzi, Mons (FR)

(73) Assignees: SNECMA, Paris (FR); CENTRE NATIONAL DE LA RECHERCHE SCIENTIFIQUE, Paris (FR); UNIVERSITE PAUL SABATIER-TOULOUSE III, Toulouse (FR)

( * ) Notice: Subject to any disclaimer, the term of this patent is extended or adjusted under 35 U.S.C. 154(b) by 275 days.

(21) Appl. No.: 13/634,420
(22) PCT Filed: Mar. 11, 2011
(86) PCT No.: PCT/FR2011/050500
§ 371 (c)(1), (2), (4) Date: Jan. 31, 2013
(87) PCT Pub. No.: WO2011/110794
PCT Pub. Date: Sep. 15, 2011

(65) Prior Publication Data
US 2013/0130052 A1    May 23, 2013

(30) Foreign Application Priority Data
Mar. 12, 2010 (FR) .................................... 10 00992

(51) Int. Cl.
*B32B 27/32*    (2006.01)
*B32B 9/00*    (2006.01)
(Continued)

(52) U.S. Cl.
CPC ............ *F01D 5/288* (2013.01); *C23C 18/1216* (2013.01); *C23C 18/1245* (2013.01); *C23C 18/1254* (2013.01); *Y10T 428/12479* (2015.01); *Y10T 428/12549* (2015.01)

(58) Field of Classification Search
CPC ............ C23C 18/1216; C23C 18/1245; C23C 18/1254; F01D 5/288
USPC .......................... 428/220, 469, 699, 701, 702
See application file for complete search history.

(56) References Cited

U.S. PATENT DOCUMENTS

| 6,756,082 B1 | 6/2004 | Subramanian et al. |
| 2007/0116883 A1 | 5/2007 | Gorman et al. |

(Continued)

FOREIGN PATENT DOCUMENTS

| EP | 1 788 122 | 5/2007 |
| JP | 2-4985 A | 1/1990 |

(Continued)

OTHER PUBLICATIONS

Office Action issued Jul. 29, 2014 in Japanese Patent Application No. 2012-556573 (English translation only).
(Continued)

*Primary Examiner* — Jonathan Langman
(74) *Attorney, Agent, or Firm* — Oblon, McClelland, Maier & Neustadt, L.L.P.

(57) ABSTRACT

The invention relates to a method for manufacturing a thermal barrier protection covering a superalloy metal substrate and comprising at least one metal sublayer (13) and a ceramic layer (14) based on zirconia stabilized with yttrium having a column structure defining pores.
The following steps are applied:
impregnation of a portion of the pores of the ceramic layer (14) with a sol based on zirconia is achieved via a sol-gel route and this in order to form an anchoring sublayer (22),
on said ceramic layer topped with said anchoring sub-layer (22), a continuous protective layer (20) based on oxide, is formed via a sol-gel route, and
a heat treatment is carried out,
whereby an outer protection layer is formed against the attack of the thermal barrier (11) by CMASes.
Application to the protection of aeronautical protection parts.

15 Claims, 2 Drawing Sheets

Figure 1:
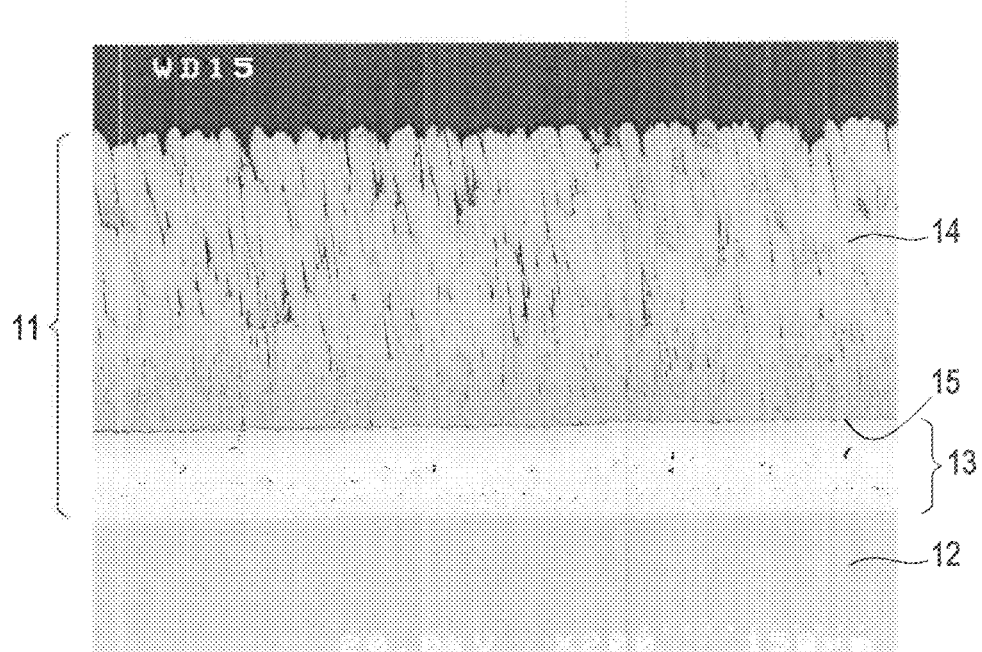

(51) Int. Cl.
  *B32B 19/00* (2006.01)
  *F01D 5/28* (2006.01)
  *C23C 18/12* (2006.01)

(56) References Cited

U.S. PATENT DOCUMENTS

| | | | |
|---|---|---|---|
| 2007/0184204 A1* | 8/2007 | Balagopal et al. | 427/419.2 |
| 2008/0176097 A1* | 7/2008 | Schlichting et al. | 428/660 |
| 2010/0047075 A1 | 2/2010 | Schlichting et al. | |
| 2010/0196605 A1 | 8/2010 | Schlichting et al. | |
| 2010/0279018 A1 | 11/2010 | Hazel et al. | |

FOREIGN PATENT DOCUMENTS

| | | |
|---|---|---|
| JP | 2007-185655 A | 7/2007 |
| JP | 2007-191794 A | 8/2007 |
| JP | 2008-133827 A | 6/2008 |

OTHER PUBLICATIONS

Troczynski, T., et al., "Post-Deposition Treatment of Zirconia Thermal Barrier Coatings Using Sol-Gel Alumina," Journal of Thermal Spray Technology ASM International, vol. 8, No. 2, pp. 229 to 234, (Jan. 1, 1999) XP-009077536.

Viazzi, C., et al., "Synthesis by sol-gel route and characterization of Yttria Stabilized Zirconia coatings for thermal barrier applications," Surface & Coatings Technology, vol. 201, No. 7, pp. 3889-3893, (Dec. 20, 2006) XP-24995908.

International Search Report Issued May 20, 2011 in PCT/FR11/050500 Filed Mar. 11, 2011.

* cited by examiner

METHOD FOR MANUFACTURING A THERMAL-BARRIER PROTECTION AND MULTILAYER COATING SUITABLE FOR FORMING A THERMAL BARRIER

This application is a 371 of PCT/FR2011/050500 filed Mar. 11, 2011. Priority to French patent application 1000992, filed Mar. 12, 2010, is claimed.

The invention relates to a method for manufacturing a thermal-barrier protection covering a superalloy metal substrate, to a multilayer coating suitable for forming a thermal barrier on a superalloy metal substrate, as well as to the thermomechanical part resulting from this manufacturing method and/or including such a coating.

The search for increasing the output of turbine engines, in particular in the aeronautical field, and for reducing fuel consumption and polluting emissions of gas and of unburned compounds has lead to getting closer to fuel combustion stoichiometry. This situation is accompanied by an increase in the temperature of the gases flowing out of the combustion chamber towards the turbine.

Today, the limiting temperature of use of superalloys is of the order of 1,100° C., the temperature of the gases at the outlet of the combustion chamber or at the inlet of the turbine may reach 1,600° C.

Accordingly, the materials of the turbine have had to be adapted to this rise in temperature, by enhancing the techniques for cooling the turbine vanes (hollow vanes) and/or by improving the high temperature resistance properties of these materials. This second route, in combination with the use of superalloys based on nickel and/or cobalt, has lead to several solutions, among which depositing a heat-insulating coating called a thermal barrier consisting of several layers, on the superalloy substrate.

The use of thermal barriers in aeronautical engines has been generalized for about twenty years and gives the possibility of increasing the inlet temperature of the gases in turbines, of reducing the flow of cooling air and thereby improving the output of the engines.

Indeed, this insulating coating gives the possibility of creating on a cooled part during steady state operation, a heat gradient through the coating, for which the total amplitude may exceed 100° C. for a coating with a thickness of about 150 to 200 µm having a conductivity of 1.1 $W.m^{-1}.K^{-1}$. The operating temperature of the underlying metal forming the substrate for the coating is thus reduced by the same gradient, which induces significant gains on the volume of air required for cooling, on the lifetime of the part and on the specific consumption of the turbine engine.

Resorting to using a thermal barrier is known, which comprises a ceramic layer based on zirconia stabilized with yttrium oxide, i.e. an yttriated zirconia comprising a molar content of yttrium oxide between 4 and 12%, which has an expansion coefficient different from that of the superalloy forming the substrate and quite low heat conductivity. The stabilized zirconia may also contain in certain cases at least one oxide from an element selected from the group consisting of rare earths, preferably in the subgroup: Y (yttrium), Dy (dysprosium), Er (erbium), Eu (europium), Gd (gadolinium), Sm (samarium), Yb (ytterbium), or a combination of a tantalum oxide (Ta) and at least one rare earth oxide, or with a combination of a niobium (Nb) oxide and at least one rare earth oxide.

Among the coatings used, mention will be made of the quite general use of a ceramic layer based on zirconia partially stabilized with yttrium oxide, for example $Zr_{0.92}Y_{0.08}O_{1.96}$.

In order to ensure anchoring of this ceramic layer, a metal sublayer with an expansion coefficient close to that of the substrate, is generally interposed between the substrate of the part and the ceramic layer. This sublayer ensures adhesion between the substrate of the part and the ceramic layer, while being aware that the adhesion between the sublayer and the substrate of the part is accomplished by interdiffusion, and that the adhesion between the sublayer and the ceramic layer is accomplished by mechanical anchoring and by the propensity of the sublayer to develop at high temperature at the ceramic/sublayer interface, a thin oxide layer which ensures chemical contact with the ceramic. Further, this metal sublayer ensures protection of the part against corrosion phenomena.

In particular, the use of a sublayer formed with an alloy of the MCrAlY type, M being a metal selected from nickel, cobalt, iron or a mixture of these metals, which consists in a gamma nickel cobalt matrix with, in solution, chromium containing β NiAl precipitates, is known.

The use of a sublayer consisting of a nickel aluminide comprising a metal selected from platinum, chromium, palladium, ruthenium, iridium, osmium, rhodium, or a mixture of these metals and/or a reactive element selected from zirconium (Zr), cerium (Ce), lanthanum (La), titanium (Ti), tantalum (Ta), hafnium (Hf), silicon (Si) and yttrium (Y), or a metal sublayer of the MCrAlYPt type, M being a metal selected from nickel, cobalt, iron or a mixture of these metals, or based on Pt, is also known.

This sublayer may finally correspond to a single diffused platinum coating which consists in a gamma-gamma prime nickel cobalt matrix with Pt in solution.

Usually, the ceramic layer is deposited on the part to be coated either by a projection technique (in particular plasma projection) or by a physical vapor deposition, i.e. by evaporation (for example Electron Beam Physical Vapor Deposition "EB-PVD" forming a deposited coating in a vacuum evaporation chamber under electron bombardment).

In the case of a projected coating, deposition of an oxide based on zirconia is carried out by plasma projection type techniques under a controlled atmosphere, which leads to the formation of a coating consisting of a stack of molten droplets subsequently impact-quenched, flattened and stacked so as to form an imperfectly densified deposit with a thickness generally comprised between 50 micrometers and 1 millimeter.

A coating deposited via a physical route, and for example by evaporation under electron bombardment, generates a coating consisting of an assembly of small columns substantially directed perpendicularly to the surface to be coated, over a thickness comprised between 20 and 600 micrometers. Advantageously, the space between the small columns allows the coating to effectively compensate for the thermomechanical stresses due to the expansion difference at the operating temperatures with the superalloy substrate.

Thus, parts with high lifetimes are obtained in high temperature thermal fatigue.

Conventionally, these thermal barriers therefore generate a heat conductivity discontinuity between the outer coating of the mechanical part, forming this thermal barrier, and the substrate of this coating forming the constitutive material of the part.

During operation, ingestion of sand in the engine leads to erosion phenomena of the surface of the ceramic and to the deposition of debris, impurities and molten salts. By "molten salts", are meant compositions of oxides containing calcium, magnesium, aluminum, silicon oxides, mixtures of these oxides, and/or any other debris from the upstream portion of the engine. These systems, mainly consisting of calcium, magnesium, aluminum and silicon oxides as a mixture (Ca—Mg—Al—SiO) are called "CMASes".

In particular, the spaces of the column structure of the ceramic may be the location of infiltration of these deposits of molten salts for temperatures above 1,100° C. After infiltration of these CMASes in the molten state into the porous surface structure of the thermal barrier coating, these molten salts cool and solidify inside the porous structure, notably between the columns. The solidified CMASes generate an accumulation of stresses, which leads to cracking and to total or partial premature flaking of the thermal barrier.

Indeed, these CMASes form high temperature eutectics and becoming quasi liquid, they seep into the porosities and interstices of the ceramic layer, sometimes reaching as far as the interface between the ceramic and the metal sublayer.

It should be noted that in this state, the CMASes react with zirconia partly stabilized with yttria (yttrium oxide), which generates embrittlement of the ceramic which then loses its integrity.

The degradation of the thermal barrier either occurs by dissolution of this ceramic layer because of the preferential etching of the elements making up the ceramic or by lowering the tolerance to deformation of the ceramic, the column structure of which can no longer play its role of absorbing stresses once that the CMASes have seeped along the columns of the ceramic. These degradations are notably formed by flaking of the ceramic layer.

Accordingly as the substrate is no longer (locally) protected by the insulating ceramic layer, it is subject to higher temperatures and is then damaged very rapidly. Thus, the involved parts (in particular the walls of the combustion chamber, the vanes, ferrules or rings and distributors of the high pressure turbine) are subject to premature damage.

Many attempts of the prior art for avoiding or delaying the occurrence of the harmful effects of CMASes are based on techniques for depositing an additional layer formed with an enamel layer (a vitrified material layer) at the surface of the thermal barrier, forming a hermetically sealed external layer intended to prevent seeping of molten CMASes into the porous structure. Document EP 1,428,908 shows one of these techniques.

However, these techniques have a certain number of drawbacks among which the fact that they require the deposition of an additional material layer with a method which is relatively heavy to apply.

The present invention therefore has the object of proposing a method for manufacturing a thermal barrier protection which is simple to apply and a thermal barrier structure resulting from this method which prevents or delays degradations caused by molten salts on the porous structure of the thermal barrier, or minimizes their extent.

The object of the present invention is also to propose a multilayer coating suitable for forming a thermal barrier on a superalloy metal substrate, and the structure of which gives the possibility of protection from degradations generated by these CMASes.

The object of the invention is also to provide a thermomechanical superalloy part resulting from this treatment method which limits the damage to the ceramic resulting from the molten salts during operation of the part, in particular a turbine vane, at a high temperature and this, in order to significantly increase the lifetime of the thermal barrier system.

For this purpose, according to the present invention, a method is proposed for manufacturing a thermal barrier protection covering a superalloy metal substrate, said thermal barrier comprising at least one metal sublayer and a ceramic layer based on zirconia stabilized with yttrium having a column structure defining pores. According to the invention, this method is characterized in that the following steps are applied:

on said ceramic layer is formed a continuous protection layer based on an oxide, via a sol-gel route, by using a sol comprising precursors of said oxide, and a heat treatment is carried out, whereby an outer protection layer is formed against the attack of CMASes of the thermal barrier.

Such a protection layer is, in certain cases, suitable for forming a sacrificial layer which delays infiltrations of CMAS into the ceramic.

By this method, it is thus possible to treat the already formed conventional barriers by creating the protective layer above, according to a very simple application which is carried out at a room temperature (sol-gel process), and therefore by avoiding the application of depositions at high temperature and/or in vacuo of the projection type.

In this way, it is understood that it is possible to form a protective layer having highly variable but controllable characteristics, notably in terms of thicknesses, composition, porosity level . . . .

This solution also has the additional advantage of further allowing the formation of a porous protective layer, which gives the possibility of avoiding stiffening of the column structure of the ceramic layer and of preserving a thermal barrier capable of accommodating the thermal stresses resulting from temperature variations during operation.

It should be noted that the pores of such a protective layer obtained via a sol-gel route do not have any preferential direction, this absence of directionality of the porous structure of the protective layer prevents any direct infiltration by molten salts.

According to an additional provision, before forming the protective layer, impregnation of at least one portion of the pores of the ceramic layer with a sol based on zirconia is carried out via a sol-gel route and this in order to form an anchoring sublayer based on zirconia for the protective layer.

In this way, by the presence of such an anchoring sublayer which matches the structure and composition of the ceramic layer, adhesion of the protective layer is facilitated, which layer is then subsequently deposited.

According to a first embodiment, said protective layer essentially includes zirconia doped with yttrium and/or with at least one element belonging to the group of lanthanides.

In this way, with a protective layer based on zirconia, a composition close to the one of the ceramic layer is found for the protective layer.

This is most particularly true in the case when the protective layer is formed from zirconia doped with yttrium oxide or yttria: then there is identity of composition between the protective layer and the ceramic layer while the different structure between these layers allows the protective layer to form a sacrificial layer at the top of the thermal barrier, the CMASes cannot directly seep therein but react with the protective layer without reaching the ceramic layer for a certain time.

This is also true in the case when the protective layer is formed from zirconia doped with at least one element belonging to the group of lanthanides (lanthanum, cerium, praseodymium, neodymium, promethium, samarium, europium, gadolinium, terbium, dysprosium, holmium, erbium, thulium, ytterbium and lutetium, as well as niobium).

Thus, in this first embodiment, either the protective layer based on zirconia includes yttria and then has the same composition as the ceramic layer, or the protective layer based on zirconia does not include any yttria in order to avoid the presence in the protective layer of a compound which may induce the formation of eutectics with the CMASes.

According to a second embodiment, said protective layer does not include any zirconium oxide, but essentially includes one or more rare earth oxides.

By "rare earths", are meant the elements belonging to the group of lanthanides (lanthanum, cerium, praseodymium, neodymium, promethium, samarium, europium, gadolinium, terbium, dysprosium, holmium, erbium, thulium, ytterbium and lutetium, as well as niobium), scandium, yttrium, zirconium and hafnium.

According to a preferential embodiment, the formation of the protective layer via a sol-gel route is carried out by using a filler-loaded sol.

In this way, by using a sol containing particles it is possible to achieve thicker deposits for the protective layer, ranging up to 100 μm.

In a preferential alternative, when a filler-loaded sol is used for forming the protective layer, the same sol is used but not filler-loaded for forming the anchoring sublayer, which gives the possibility of preserving large chemical affinity between the anchoring sublayer and the protective layer with a greater viscosity for the sol intended to form the anchoring sublayer which will thus fill the pores of the ceramic layer easier and more deeply.

Thus, in this case, the formation of the anchoring sublayer with a non-filler-loaded sol is achieved and the filler-loaded sol used for forming the protective layer via a sol-gel route has a binder formed with a sol having the same composition as the non-filler-loaded sol and a filler formed with powder particles. Advantageously, these powder particles are obtained from the same non-filler-loaded sol as the one used for forming the anchoring sublayer.

The present invention also relates to the multilayer coating resulting from the aforementioned manufacturing method, as well as to the superalloy parts included in such a coating.

The coating object of the present invention is a multilayer coating suitable for forming a thermal barrier on a superalloy metal substrate, comprising at least one metal sublayer positioned on the substrate, a layer of ceramic based on zirconia stabilized with yttrium covering said sublayer and having a column structure defining pores and a protective layer based on an oxide, covering the ceramic layer by forming a continuous film.

It is generally seen that said protective layer is further infiltrated into at least one portion of the pores of the ceramic layer.

According to an additional provision, said coating further includes an anchoring sublayer based on zirconia resulting from a sol, positioned between the ceramic layer and the protective layer and in at least one portion of the pores of the ceramic layer.

Indeed, it was shown that direct deposition of the protective layer on the ceramic layer might generate significant stresses during the heat treatment, which may lead to premature decohesion of the multilayer coating.

Within the scope of the invention, the anchoring sublayer has the role of increasing the chemical affinity of the protective layer towards the ceramic layer. For this purpose, the anchoring sublayer is thin and dense and ensures good adhesion with the substrate: it allows development of chemical bonds with the ceramic layer and increase in the cohesion of the whole of the multilayer coating. It plays the role of a chemical interface between the ceramic layer and the protective layer.

According to the invention, said protective layer preferably has a thickness comprised between 1 and 100 μm, preferably between 2 and 50 μm and preferably between 2 and 10 μm.

According to the invention, said protective layer has a non-oriented porosity: indeed, as discussed earlier notably by the application with the sol-gel process, any presence of oriented porosity is prevented in the protective layer and this in order to prevent direct infiltration of the CMASes.

Advantageously, said protective layer is thicker than said anchoring sublayer (by considering the thickness of the anchoring sublayer as that of what juts out above the ceramic layer). For example, said protective layer is 2 to 50 times thicker than said anchoring sublayer and preferably 5 to 40, advantageously 10 to 20 times thicker than said anchoring sublayer.

As an example, the anchoring sublayer has a thickness of the order of 2 to 5 μm and the protective layer which tops it, has a thickness of the order of 40 to 60 μm, i.e. 10 to 15 times more.

Advantageously, the size of the grains of the protective layer is larger than the size of the grains of the anchoring sublayer: the average grain size of the protective layer is for example from 5 to 20, advantageously from 8 to 10 times larger than the average size of the grains of the anchoring sublayer.

As an example, the anchoring sublayer has a grain size of the order of 80 to 100 nm (nanometers) and the protective layer which tops it, has a grain size of the order of 800 nm (nanometers) to 2 μm (micrometers).

Advantageously, the distribution of the size of the grains of the anchoring sublayer is more homogeneous than the distribution of the size of the grains of the protective layer.

Thus, advantageously, according to the invention a coating structure is encountered in which the anchoring sublayer has a microstructure with fine and homogeneous grains and the protective layer, forming a thicker active layer, has a microstructure with grains of larger size and less monodisperse.

Figure 2:
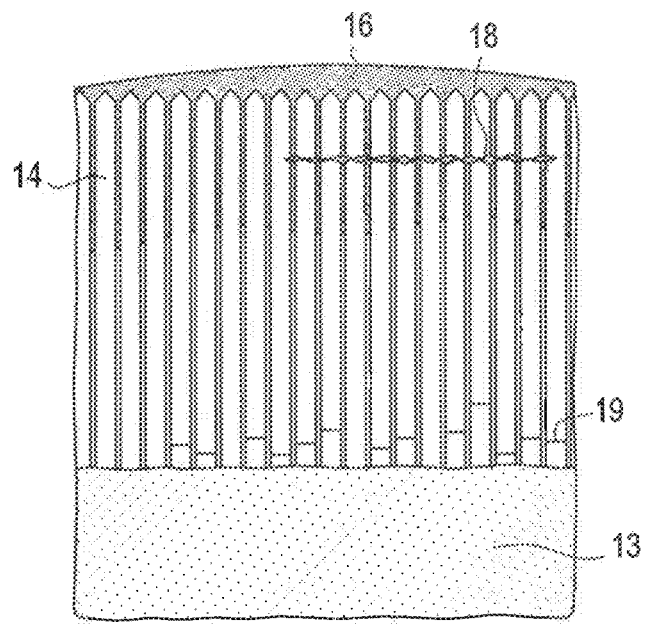
Figure 3:
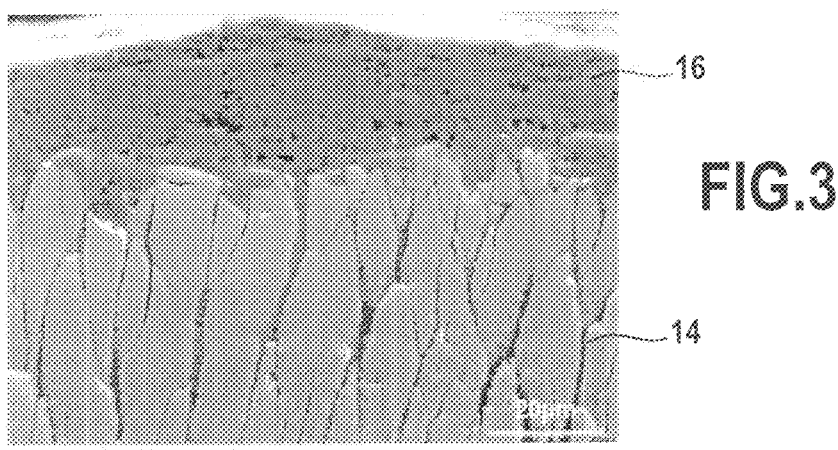
Figure 4:
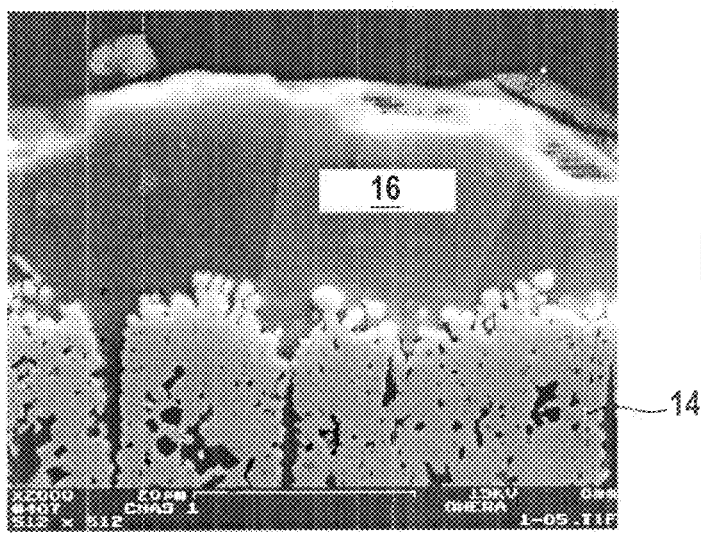
Figure 5:
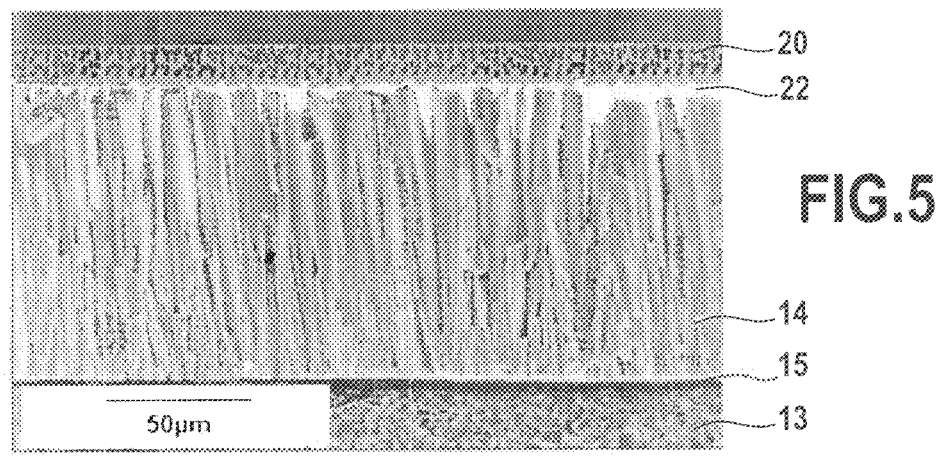

Other advantages and features of the invention will become apparent upon reading the following description made as an example and with reference to the appended drawings wherein:

FIG. 1 is a micrograph section which shows the different layers of the thermal barrier at the surface of a mechanical part coated with a thermal barrier according to the prior art, FIG. 2 is a diagram illustrating a section of the structure of the thermal barrier, little after exposure to infiltrations of molten salts or CMASes, FIGS. 3 and 4 are micrograph sections which show the degradation of the surface of the thermal barrier, respectively a little after and later after exposure to infiltrations of molten salts or CMASes, and FIG. 5 shows the multilayer coating according to the present invention.

The surface of the thermomechanical part partly illustrated in FIG. 1 includes a thermal barrier coating 11 deposited on a substrate 12 in superalloy, such as superalloys based on nickel and/or cobalt. The thermal barrier coating 11 includes a metal sublayer 13 deposited on the substrate 12 and a ceramic layer 14, deposited on the sublayer 13.

The binding sublayer 13 is a metal sublayer consisting of nickel aluminide.

The ceramic layer 14 consists of yttriated zirconia comprising a molar content of yttrium oxide between 4 and 12% (partly stabilized zirconia). Stabilized zirconia 14 may also contain in certain cases at least one oxide of an element selected from the group consisting of rare earths, preferably from the subgroup: Y (yttrium), Dy (dysprosium), Er (erbium), Eu (europium), Gd (gadolinium), Sm (samarium), Yb (ytterbium), or a combination of a tantalum oxide (Ta) and of at least one rare earth oxide, or with a combination of a niobium (Nb) oxide and of at least one rare earth oxide.

During the manufacturing, the binding sublayer 13 was oxidized prior to the deposition of the ceramic layer 14, whence the presence of an intermediate alumina layer 15 between the sublayer 13 and the ceramic layer 14.

In the view of FIG. 2, a diagram is found illustrating the different aforementioned layers, with a typical column structure of the ceramic layer 14 present at the surface.

During this operation, the part (for example a turbine blade) is subject to hundreds of high temperature cycles (of the order of 1,100° C.), during which the molten salts 16 (CMASes) may come to the surface and seep into the pores and interstices of the column structure over a certain thickness of the ceramic layer 14 (see FIG. 2).

These molten salts 16 solidify and lead to the formation of stresses which generate, by a heat shock, during cooling of the part, cracks 18 in the ceramic layer 14, which leads to delamination, i.e. starting from a surface portion of the ceramic layer 14.

The thermal expansion stresses also cause detachment of certain columns from the ceramic layer in proximity to the binding sublayer 13 (see the locations 19 of FIG. 2).

If reference is respectively made to FIGS. 3 and 4, it is seen that the CMAS deposit in the form of molten salts 16, which cover the ceramic layer 14 by penetrating between the columns of the latter (FIG. 3), cause degradations of the thermal barrier notably by reaction between these molten salts 16, and the yttria contained in the ceramic layer 14 which then tends to dissolve (see the disintegration of the ceramic layer 14 in FIG. 4).

Within the scope of the present invention, the applicant sought to protect the microstructure of the ceramic layer 14 in its upper portion in order to delay, limit or even stop infiltration of molten salts at high temperature into the ceramic layer 14 and to thereby increase the lifetime of the part coated with the thermal barrier.

The solution was found by using a protective layer 20 (see FIG. 5), which covers the whole surface of the ceramic layer 14, in order to protect the latter from attack by CMASes.

As this has already been specified earlier, and as this appears in FIG. 5, provision is made for interposing an anchoring layer 22 between the protective layer 20 and the ceramic layer 14.

The protective layer 20 and the anchoring layer 22 are deposited on the ceramic layer via the sol-gel route.

As this deposit is carried out via a liquid route, it allows penetration of the sol into the pores, and notably between the columns, of the ceramic layer 14 (this is the anchoring layer 22 and in certain cases the anchoring layer 22 and the protective layer 20).

It is recalled that the sol-gel route is a "mild chemistry" synthesis method used for elaborating at low temperature (notably at room temperature) ceramic powders and layers of the oxide type. This method uses a mixture of iron precursors (metal salts) and/or molecular precursors (metal alkoxides). In this liquid phase called a sol, hydrolysis and condensation chemical reactions contribute to forming a three-dimensional inorganic network (gel) within infinite viscosity in which remains the solvent.

In order to remove this solvent, there exist two possible drying methods: on the one hand, conventional drying which gives the possibility by drying in an oven at low temperature and at atmospheric pressure, of drying the zirconia precursor gel in order to form a xerogel in which the three-dimensional network of the gel disappears; on the other hand, it is possible to perform drying under supercritical conditions, which gives the possibility after evaporation of the solvent of retaining the three-dimensional network of the gel. In this case, an aerogel is formed which, at the end of a subsequent calcination step, leads, as in the case of a xerogel, to the formation of powder particles. Such particles may be used as fillers in forming a filler-loaded sol. It is noted that in the case of an aerogel, the particles are much finer (a size of less than 500 nm), monodisperse and with a high specific surface area.

In addition to the lowering of the synthesis temperatures as compared with conventional projection methods (notably EPBVD), the sol-gel route further gives the possibility of obtaining for the protective layer 20, zirconium oxides of great purity but also zirconium oxides doped with elements such as yttrium or other rare earths.

The sol-gel route is therefore a method for synthesizing ceramic materials of the oxide type, but also a shaping method, since several techniques may be combined in order to carry out deposition of sol in order to elaborate ceramic layers.

The most used deposition process for elaborating a layer of oxide of the ceramic type via a sol-gel route is dipping (or "Dip Coating"). It consists of immersing the substrate to be coated, in this case the part coated with the thermal barrier 11, in a sol, and then of withdrawing it at a controlled speed so that a film of the desired thickness may homogeneously cover the surface with good adhesion. There exist other deposition techniques such as notably centrifugation (or 'Spin-Coating') or spraying (or 'Spray-Coating').

Generally, the deposits obtained from a sol have thicknesses which reach at most 2 to 3 μm. In order to make a thicker deposit (generally up to 100 μm), the deposit medium used is a sol containing particles, a so-called filler-loaded sol. In the latter case, this deposit medium consists of molecular precursors of the sol, to which are added as a suspension, particles with chemical and structural compositions identical with those of the sought oxide and the size, the morphology and physico-chemical characteristics of which lead to a stable suspension. These particles may stem from the sol-gel route but also from any other process leading to the elaboration of nanometric and monodisperse particles.

The protective layers 20 (and optionally the anchoring layers 22) obtained by dipping from a filler-loaded sol are therefore composite and consist after drying of a xerogel phase (stemming from the sol) in which are dispersed particles initially present in the deposit suspension.

In order to finalize the formation of the protective layer 20 in ceramic and of the anchoring layer 22, the latter subsequently undergo a heat treatment in air during which will successively occur evaporation of the solvents (100° C.) and then calcination of the organic compounds (300 to 450° C.), thus leading to the formation of an amorphous oxide.

Other types of heat treatments are possible by modifying the atmosphere, the temperature rise rate as well as the temperature values of the ramp and of the plateau, and this in order to obtain the sought oxide phase with the predefined structural parameters.

At the end of these different steps, the protective layers 20 and the anchoring layers 22 obtained with a thickness comprised between 1 and 100 μm, in every case, have a non-oriented porosity which essentially depends on the characteristics of the initial sol (composition, size and morphology of the particles entering the composition of the sol when it is loaded, viscosity of the sol, presence of plasticizer and/or porogenic agents, etc).

Thus, it is understood that the sol-gel process is of interest for achieving protection of thermal barriers with a column texture, such as those from the projection method EPBVD.

Indeed, the sol-gel route associated with a heat post-treatment allows elaboration of ceramic materials of the oxide type having structural compositions and characteristics identical with those obtained by conventional techniques.

It is therefore possible to deposit protective layers 20 formed with zirconia stabilized with yttrium (identical composition but different structure from those of the ceramic layer 14).

This technique is also adapted to the synthesis of a substitution solid solution with a rare earth (protective layer (20) essentially consisting of one or several rare earth oxides).

In this way, a protective layer 20 and an anchoring layer 22 are obtained, which have a non-directional porous texture in which the porosity level is controlled.

Moreover, this deposition method via a liquid route is on the one hand adapted to the impregnation of a porous material (here the ceramic layer 14) by the action of the physico-chemical characteristics of the deposit medium (non-filler-loaded sol or filler-loaded sol) and on the other hand gives the possibility of covering surfaces having strong roughness (of the order of Ra=15 microns) with a very significant leveling effect.

The sol gel process therefore appears as a very suitable solution for combating degradation of thermal barriers 11 by molten CMAS salts.

This process moreover gives the possibility of adapting the characteristics of the protective layers 20 and of the anchoring layers 22, i.e. their composition, their crystallographic structure, their porosity level . . . .

Two families of materials may be distinguished for the protective layers 20 and the anchoring layer 22, which are distinguished from each other by their modes of action.

First, the layers 20 and 22 may form a sacrificial layer in the case when they consist of a composition identical with that of the ceramic layer 14, in this case zirconia doped with yttrium oxide. In this case, the characteristics of the filler-loaded sol (notably the level, the size and morphology of the particles) allow control of the density of pores of the layer which result therefrom. The presence of non-directional porosity is an obstacle to the diffusion of the eutectic formed with CMASes. In this way, there will be a preferential degradation of this protective surface layer 20 stemming from the sol-gel route, which allows at least temporary protection of the underlying functional thermal barrier 11.

Secondly, and notably for increasing the efficiency of the protective layer 20, the latter may be elaborated from sols and from filler-loaded sols which do not contain any compounds which may induce the formation of eutectic with the CMASes, as this is the case with yttria. In this case, the sols and the filler-loaded sols applied consist of zirconia precursors doped with oxides belonging to the family of lanthanides or other oxide precursors, notably of rare earth oxides. There again, the content of the components of the sol, as well as the heat treatment conditions may be adapted depending on the sought crystalline phase for the protective layer 20 (and the anchoring layer 22) which results therefrom.

It may be noted that the use of fine powder particles stemming from the calcination of aerogels of zirconia as a filler of a filler-loaded sol is an effective means in order to obtain from a filler-loaded sol, zirconia coatings forming a protective layer perfectly covering the surface of the ceramic layer 14 coated beforehand with the anchoring sublayer, while being able to seep into the possible residual porosity.

The invention claimed is:

1. A multilayer coating comprising:
    a metal sublayer positioned on a superalloy metal substrate;
    a ceramic layer comprising zirconia stabilized with yttrium covering the metal sublayer and having a column structure defining pores;
    a protective layer comprising an oxide, wherein the protective layer is a continuous film that covers the ceramic layer; and
    an anchoring sublayer comprising zirconia, positioned between the ceramic layer and the protective layer and further disposed in at least one portion of the pores of the ceramic layer, wherein the anchoring sublayer is obtained from a sol,
    and wherein a size of grains of the protective layer is larger than a size of grains of the anchoring sublayer.

2. The coating of claim 1, wherein the protective layer is further disposed into at least one portion of the pores of the ceramic layer.

3. The coating of claim 2, wherein the protective layer has a thickness between 1 and 100 μm.

4. The coating of claim 1, wherein the protective layer has a thickness between 1 and 100 μm.

5. The coating of claim 1, wherein the protective layer has non-oriented porosity.

6. The coating of claim 1, wherein the protective layer comprises zirconia doped with at least one element selected from the group consisting of yttrium and a lanthanide.

7. The coating of claim 6, wherein the protective layer:
    has a thickness between 1 and 100 μm;
    has non-oriented porosity; and
    is thicker than the anchoring sublayer.

8. The coating of claim 1, wherein the protective layer comprises a rare earth oxide.

9. The coating of claim 8, wherein the protective layer:
    has a thickness between 1 and 100 μm;
    has non-oriented porosity; and
    is thicker than the anchoring sublayer.

10. The coating of claim 1, wherein the protective layer is thicker than the anchoring sublayer.

11. The coating of claim 10, wherein the protective layer is 2 to 50 times thicker than the anchoring sublayer.

12. The coating of claim 1, wherein the size of grains of the protective layer is 8 to 10 times larger than the size of grains of the anchoring sublayer.

13. The coating of claim 12, wherein a distribution of the size of the grains of the anchoring sublayer is more homogeneous than the distribution of the size of the grains of the protective layer.

14. The coating of claim 1, wherein the size of grains of the protective layer is 800 nm-2 μm and the size of grains of the anchoring sublayer is 80-100 nm.

15. The coating of claim 1, wherein the protective layer:
    has a thickness between 1 and 100 μm;
    has non-oriented porosity; and
    is thicker than the anchoring sublayer.

* * * * *